March 26, 1957     E. B. LUTTRELL     2,786,458
TWO CYCLE INTERNAL COMBUSTION ENGINE
Filed April 9, 1956     2 Sheets-Sheet 1
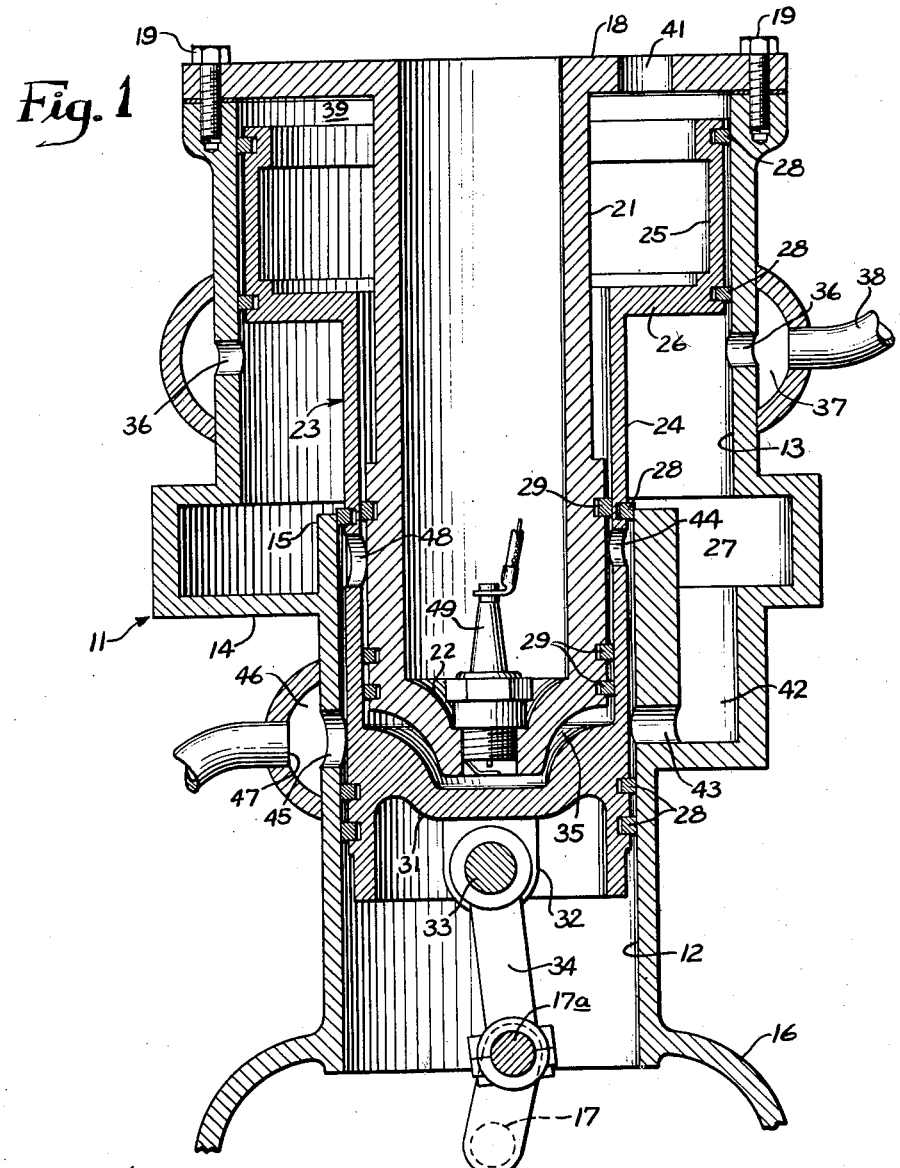
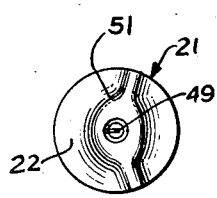
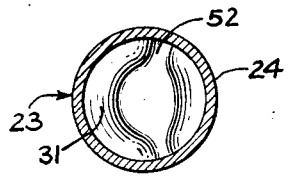
Inventor
EARL B. LUTTRELL March 26, 1957 E. B. LUTTRELL 2,786,458
TWO CYCLE INTERNAL COMBUSTION ENGINE
Filed April 9, 1956 2 Sheets-Sheet 2
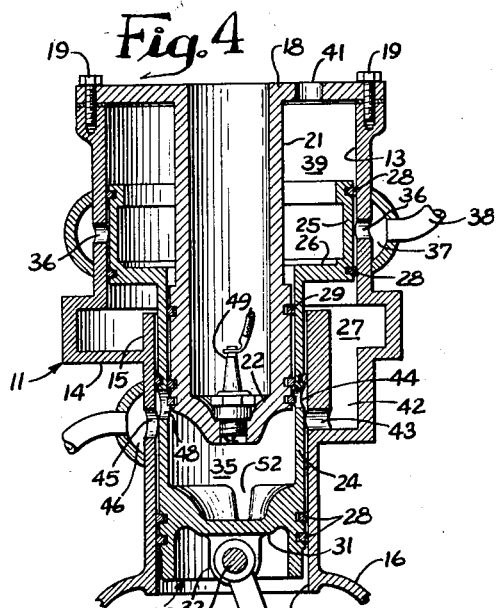
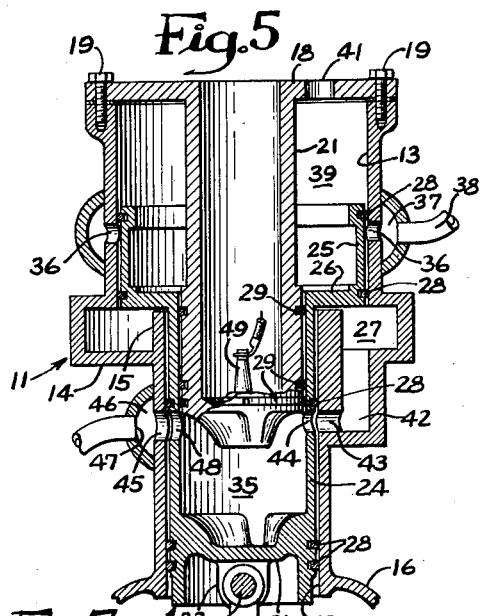
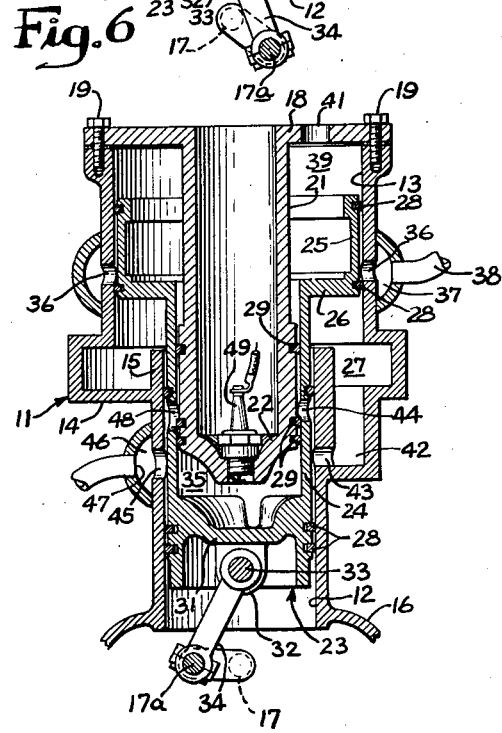
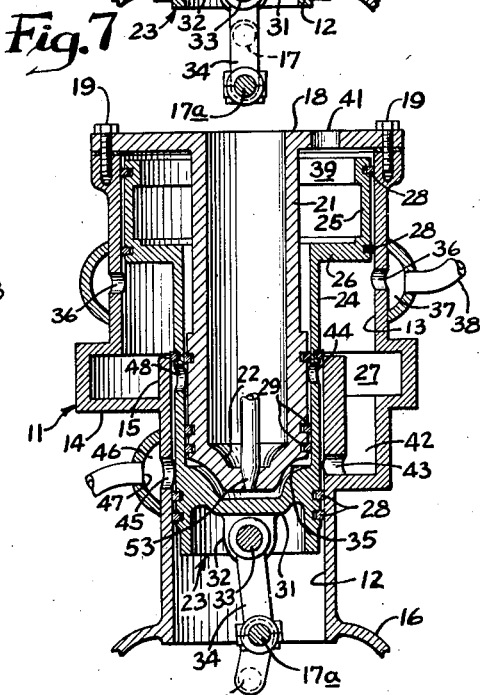
Inventor
EARL B. LUTTRELL
by: Charles H. Redman atty.

United States Patent Office 2,786,458
Patented Mar. 26, 1957

2,786,458

TWO CYCLE INTERNAL COMBUSTION ENGINE

Earl B. Luttrell, Sandwich, Ill., assignor of twenty-five percent to Hurdman W. Bark, Sandwich, Ill.

Application April 9, 1956, Serial No. 577,028

2 Claims. (Cl. 123—50)

The invention relates to improvements in reciprocating engines and is more particularly concerned with the novel construction, arrangement of parts and operation of a two cycle type internal combustion engine which does not require the use of cam actuated valves, external compressors or internal rotary compressors.

The reciprocating engine embodying the present invention comprises a structure that includes means to pre-compress air or a fuel-air mixture prior to its injection under pressure into the combustion chamber, said pre-compression taking place during the performance of a power stroke. This is accomplished in the present instance by providing a cylinder block with a dual diameter cylinder bore so as to cooperatively receive for operation therein a stepped or two diameter sleeve type piston. It is therefore an object of the invention to provide an engine embodying these characteristics.

The structure also includes a novel cylindrical type piston which is telescoped over a fixed hub or core arranged within the cylinder bore so as to define with the piston a combustion chamber having fuel intake and exhaust openings in the wall of the piston. It is therefore another object to provide an engine embodying these features.

Another object of the invention is to provide a reciprocating engine of the character referred to with novel means to increase or decrease the maximum pressure obtainable during a compression stroke of the operating piston.

Another object is to provide a reciprocating engine with novel structural characteristics permitting its conversion, with slight modification, for use as an internal gasoline fired engine or as a low grade fuel burning diesel type engine.

Another object of the invention is to provide a novel reciprocating engine construction that is not difficult or expensive to manufacture, is inexpensive to operate and maintain, and is highly satisfactory in use.

With the foregoing and such other objects in view which will appear as the description proceeds, the invention consists of certain novel features of construction, arrangement and combination of parts hereinafter fully described, illustrated in the accompanying drawings, and particularly pointed out in the appended claims, it being understood that various changes in form, proportion, size and minor details of the structure may be made without departing from the spirit of the invention.

Referring to the drawings in which the same characters of reference are employed to identify corresponding parts:

Fig. 1 is a vertical transverse sectional view of an internal combustion engine embodying the invention, and illustrating the parts in positions occupied immediately following ignition of the compressed combustible fuel therein;

Fig. 2 is an enlarged detail view taken on line 2—2 of Fig. 1;

Fig. 3 is an enlarged detail sectional view taken on line 3—3 of Fig. 1;

Fig. 4 is a sectional view similar to Fig. 1 but showing the piston in a position assumed as the end of its power stroke is approached;

Fig. 5 is a view similar to Fig. 4 but showing the piston at the end of its power stroke;

Fig. 6 is a view similar to Fig. 4, showing the piston in a position occupied during its compression stroke; and, Fig. 7 is a sectional view similar to Fig. 1 but showing a fuel injection nozzle mounted in the stationary core.

The present disclosure is restricted to a structure embodied in a one cylinder reciprocating engine, but it should be understood that the construction is equally applicable to engines of the multi-cylinder type.

Referring to the accompanying drawings, a cylinder block 11 is provided with a lower bore 12 and an upper bore 13 concentric with but of larger diameter than the bore 12 and integrally connected therewith by a horizontal circumferential wall 14. A cylindrical wall or flange 15 having the same inside diameter as the bore 12 extends upwardly into the upper bore 13 to provide a concentric extension of the bore 12. The cylinder block 11 includes a crank case 16 beneath and in communication with the bore 12. A crank shaft 17 is journalled within the crank case in a conventional manner. A head 18 is secured to the top of the cylinder block in any suitable manner such as, for example, by means of bolts 19. This head has a hollow depending core 21 preferably integral therewith that extends downwardly through the upper bore 13 and into the lower bore 12. The core 21 is concentric with the bores and it has an outside working circumference substantially smaller than the inside circumferential surface of the lower bore 12 for a purpose to become apparent presently. A wall 22 closes the bottom end of the core 21 and is integral therewith.

A hollow or sleeve type piston 23 is arranged for reciprocation in the bores 12 and 13 of the cylinder block 11. As shown, the piston 23 includes a lower cylindrical wall 24 that has an operating fit in the lower cylinder bore 12 and a larger diameter upper cylindrical wall or collar 25 joined to the lower cylindrical wall by a horizontally disposed circumferential wall 26. The cylindrical wall 25 has an operating fit in the upper cylinder bore 13 and defines therewith a fuel-air mixture compressing chamber 27, or pressure-vacuum compartment, having as its top wall the horizontal piston wall 26 and as its bottom wall the horizontal wall 14 of the cylinder block.

The inside circumferential surface of the smaller lower circumferential wall portion 24 of the piston 23 has a reciprocal working fit over the lower machined end portion of the core 21 which projects into it. In order to provide gas and oil tight seals at the matching surfaces of the piston 23 and bores 12 and 13, the piston is provided with the usual oil and compression rings, as at 28. Similarly, the lower machined end portion of the core 21 carries oil and compression rings, as at 29, that coact with the cylindrical piston wall 24 to afford a seal. Obviously, the number of rings illustrated is not critical, it being understood that more or less such rings than are shown may be utilized to suit actual service conditions.

The bottom end of the piston 23 is closed by an end wall 31 integral with the cylindrical wall 24. The bottom or end wall 31 carries on its outside surface, a bearing 32 to receive a wrist pin 33 that connects one end of a connecting rod 34 to the piston. The other end of the connecting rod is connected to the crank portion 17a of the crank shaft 17.

The space within the lower portion of the sleeve type piston 23; that is, the space between its bottom wall 31 and the bottom wall 22 of the core 21, constitutes a fuel combustion chamber 35. In order to provide for the admittance of a fuel-air mixture into said chamber, the cylinder block 11 and piston 23 are provided with a series of related ports or passageways adapted to be carried into and out of registering alignment during reciprocal movement of the piston within the cylinder bores 12—13. As illustrated, the circumferential wall of the upper cylinder bore 13 has circumferentially spaced ports 36 that communicate, on the outside of said wall, with a circumferential fuel passage 37. In the embodiment shown in Figs. 1 through 6, the passage 37 has a fuel inlet connection, at 38, with a carburetor (not shown) or other source of fuel-air mixture supply.

When the piston is in a predetermined position during operation of the engine, as explained in detail hereinafter, the ports 36 are closed by reason of the fact that the wall of the larger diameter or collar 25 of the piston 23 overlies the ports. When the piston has moved upwardly sufficiently to uncover the ports 36, a fuel-air mixture is admitted into the partially evacuated circumferential fuel compressing chamber 27. Initial movement of the piston 23 in a downward direction again closes the fuel inlet ports 36 and continued downward movement of the piston for a predetermined remaining portion of its downward cycle compresses the fuel-air mixture in the compressing chamber 27. Air at atmospheric pressure is permitted to circulate freely within the upper portion 39 of the cylinder bore 13 through the provision of one or more air vents 41 in the cylinder head 18.

The fuel compressing chamber 27 has a well or sump 42 in its bottom wall 14. A passageway 43 is provided in the flange 15 to place the interior of the well 42 in communication with the interior of the small cylinder bore 12. This passageway 43 is closed by the piston wall 24 during a part of the cycle of piston reciprocation. However, when the piston has reached the proximate limit of its downward movement, a port 44 in the piston wall 24 moves into registering alignment with the passageway 43 to thereby place the combustion chamber 35 in direct communication with the sump 42 and permit compressed fuel-air mixture to be admitted into the combustion chamber from the compressing chamber 27.

An exhaust port 45 is provided in the wall of the cylinder bore 12, preferably diametrically opposed to and larger than the fuel inlet ports. This port communicates with an externally arranged exhaust chamber 46 having an outlet 47 communicating with atmosphere. The exhaust port 45 is adapted to be closed for a predetermined period of time during piston reciprocation by the piston wall 24. However, said wall has a port 48 therein, preferably larger in area than the fuel mixture inlet port 44, which is carried into substantial register with the exhaust port 45 when the piston reaches the proximate end of its power stroke.

In order to provide for ignition of the compressed fuel-air mixture in the combustion chamber 35 of the engine shown in Figs. 1 to 6 inclusive, there is provided in the core end wall 22 a spark plug 49, or other acceptable igniting device, which is suitably connected with an electrical circuit (not shown) to be activated when the piston reaches the limit of its compression stroke. The maximum pressure obtainable during the compression stroke may be increased or decreased by raising or lowering the core 21 relative to the piston end wall 31. This may be accomplished by making the core adjustable in the cylinder head or by increasing or decreasing the number of gaskets interposed between the head and cylinder.

In operation, the Figs. 1 to 6 engine functions as a two cycle engine substantially as follows:

With the piston 23 located at the end of its compression stroke, thus compressing the combustible fuel mixture in the combustion chamber 35 preparatory for firing, as indicated in Fig. 1, an additional fuel-air mixture is admitted at atmospheric pressure into the fuel pre-compressing chamber 27 through the ports 36 which are now uncovered by the large diameter piston wall 25. The ignition system then functions to fire the spark plug 49 and ignite the fuel in the combustion chamber 35. This drives the piston 23 downwardly through a power stroke to rotate the crank shaft 17. Following initial downward movement of the piston, the fuel intake ports 38 are closed by the piston collar 25 and the fuel-air supply within the compressing chamber 27 is compressed during substantially all of the remaining downward movement of the piston by the descending piston wall 26.

As the piston approaches the end of its power stroke, as shown in Fig. 4, the exhaust ports 45 and 48 are carried into registering alignment to permit the expended gases to escape from the combustion chamber 35. During this same period or direction of piston movement, the fuel intake ports 43 and 44 are carried into registering alignment. It is important to note however, that initial registration of said ports 43—44 follows behind initial registration of the larger exhaust passageways 45—48.

The fuel-air mixture that has been compressed in chamber 27 now flows under pressure through the ports 43—44 into the combustion chamber 35, as illustrated in Fig. 4. As is shown, this stream of fuel flowing under pressure into the combustion chamber 35 is diametrically opposed to the exhaust outlet passageway 45—48. Obviously, under such conditions there would be a likelihood of some of the live fuel-air mixture intermingling with the expended gases and escaping through the aligned exhaust ports. Similarly, some of the expended gases might be so diverted from the exhaust ports as to be retained in the combustion chamber and dilute the combustible fuel mixture therein. This situation is avoided by providing means within the combustion chamber to deflect the inflowing fuel-air mixture downwardly so as to cause it to generate a turbulence of fuel and gases in a substantially circular path but in a vertical plane.

The structure provided to accomplish this result is best illustrated in Figs. 1, 2 and 3, where it will be observed that the combustible fuel mixture flowing into the combustion chamber 35 strikes a baffle 51, which is preferably in the form of a cordal rib on the bottom face of the core wall 22. Upon striking the baffle the combustible fuel stream is deflected downwardly against the inside face of the piston end wall 31 which is formed with a cordal groove or channel 52 matching the rib 51. Most efficient operation has been found to be attained when the cordal rib and its cooperating channel are located on a cordal line which intersects a diametrical line arranged perpendicular thereto at a point spaced inwardly from its end approximately one third of its length. The combustible fuel mixture entering the combustion chamber is deflected downwardly by the rib 51 and then inwardly radially and finally upwardly so as to push substantially all of the expended gases ahead of it and out through the registering exhaust passages 48—45. The path of the incoming fuel mixture is substantially as illustrated in Fig. 5, that is, it follows a circular path in a vertical plane. The intake and exhaust ports are so proportioned relative to each other that the expended gases are free to escape for a period of time before, during and after the inflow of the incoming fuel mixture and at a rate that does not impede the pressurized flow of combustible fuel-air mixture into the combustion chamber.

Exhausting of expended gases and feeding of combustible fuel-air mixture from and into the combustion chamber occurs during a period of the operating cycle beginning at the time the related ports, 45—48 and 43—44, are first moved into register at the proximate end of the power stroke (Fig. 4) until the piston 23 has moved an initial equivalent distance through its compression stroke. Accordingly, the exhaust of expended gases is given impetus during the initial stage of the compression stroke and it continues for an instant after the fuel inlet ports have been closed owing to the relative position longitudinally on the piston of the respective ports. However, continued movement of the piston 23 upwardly during its compression stroke (Fig. 6) again closes both the inlet and exhaust ports and the combustible fuel-air mixture within the combustion chamber 35 is compressed preparatory for firing. As soon as the piston reaches the limit of its fuel compression stroke (Fig. 1) the cycle first described above is repeated.

The engine herein disclosed will operate efficiently when provided with a fuel injection system, as shown in Fig. 7. In such event, fuel may be injected as a vapor directly into the combustion chamber 35 through an injection nozzle 53 mounted in the core 21 in lieu of the spark plug. The precompressing chamber 27 will function in the same manner as previously described except that it will receive air at atmospheric pressure through ports 36 and compress the same prior to injecting it into the combustion chamber 35 in which it is further compressed to a point at which its temperature, due to compression, is above the point of ignition of the fuel being used. When so compressed, the fuel sprayed into the combustion chamber ignites and drives the piston downwardly through its power cycle, thus pre-compressing a fresh supply of air and then admitting it into the combustion chamber while exhaust gases are being discharged therefrom.

Although exemplary embodiments of the invention have been shown and described, it should be understood that the invention is capable of being embodied in a variety of modified structures and that it is not desired to limit the invention to the disclosures but to embrace such other variations as will fall within the scope of the appended claims.

I claim:

1. In a reciprocating engine of the two-cycle type including a cylinder block having a bore therein consisting of two essentially different diameters with the larger diameter at its upper portion, a circumferential flange on the same inside diameter as the lower portion of said bore projecting into the upper bore portion and constituting an extension on the lower bore portion, a cylindrical piston reciprocal in said lower bore portion, said piston being hollow and including an integral bottom wall at one end and an external collar on its other end reciprocal in the upper bore portion to define therewith a fuel compressing chamber, a core extending into the piston and defining therewith a combustion chamber, fuel intake means communicating with the fuel compressing chamber uncovered by the collar portion when the piston is in proximate position to fully compress fuel in the combustion chamber, a passageway in said circumferential flange connecting the fuel compressing chamber with the lower bore portion, said passageway being placed in communication with the combustion chamber through an opening in the piston wall when the piston is at the proximate end of its power stroke so as to admit compressed fuel from the compressing chamber, and exhaust ports substantially diametrically opposed to the fuel inlet openings connecting the combustion chamber with atmosphere adapted to register when the piston is at the proximate end of its power stroke to exhaust expended gases from the combustion chamber.

2. In a reciprocating engine of the two-cycle type including a cylinder block having a bore therein consisting of two essentially different diameters with the larger diameter at its upper portion, a circumferential flange of the same inside diameter as the lower portion of said bore projecting into the upper bore portion and constituting an extension of the lower bore portion, a cylindrical piston reciprocal in said lower bore portion, said piston being hollow and including an integral bottom wall at one end and an external collar on its other end reciprocal in the upper bore portion to define therewith a fuel compressing chamber, a core extending into the piston and defining therewith a combustion chamber, fuel intake means communicating with the fuel compressing chamber uncovered by the collar portion when the piston is in proximate position to fully compress fuel in the combustion chamber, a passageway in said circumferential flange connecting the fuel compressing chamber with the lower bore portion, said passageway being placed in communication with the combustion chamber when the piston is at the proximate end of its power stroke so as to admit compressed fuel from the compressing chamber, and exhaust ports connecting the combustion chamber with atmosphere adapted to register when the piston is at the proximate end of its power stroke to exhaust expended gases from the combustion chamber.

References Cited in the file of this patent

UNITED STATES PATENTS

| 1,040,153 | Crothers | Oct. 1, 1912 |
| 1,156,075 | Head | Oct. 12, 1915 |
| 1,390,572 | Luce et al. | Sept. 13, 1921 |
| 1,414,072 | Davidson | Apr. 25, 1922 |
| 1,437,929 | Brockway | Dec. 5, 1922 |
| 1,520,353 | Kavanaugh | Dec. 23, 1924 |
| 1,686,236 | Hetlesater | Oct. 2, 1928 |
| 2,393,703 | Neumann et al. | Jan. 29, 1946 |
| 2,525,131 | Hallett | Oct. 10, 1950 |